(12) United States Patent
Welham et al.

(10) Patent No.: US 9,011,574 B2
(45) Date of Patent: Apr. 21, 2015

(54) METHOD FOR LEACHING OF COPPER AND MOLYBDENUM

(75) Inventors: Nicholas James Welham, Ballarat (AU); Garry Mervyn Johnston, Claremont (AU); Matthew Leslie Sutcliffe, London (GB)

(73) Assignee: MetaLeach Limited, Tortola (VG)

( * ) Notice: Subject to any disclaimer, the term of this patent is extended or adjusted under 35 U.S.C. 154(b) by 111 days.

(21) Appl. No.: 13/819,148

(22) PCT Filed: Aug. 29, 2011

(86) PCT No.: PCT/AU2011/001113
§ 371 (c)(1),
(2), (4) Date: May 2, 2013

(87) PCT Pub. No.: WO2012/024744
PCT Pub. Date: Mar. 1, 2012

(65) Prior Publication Data
US 2013/0220078 A1 Aug. 29, 2013

(30) Foreign Application Priority Data
Aug. 27, 2010 (AU) ................................ 2010903845

(51) Int. Cl.
*C22B 15/00* (2006.01)
*C22B 34/34* (2006.01)

(52) U.S. Cl.
CPC ......... *C22B 15/0078* (2013.01); *C22B 15/0069* (2013.01); *C22B 34/34* (2013.01)

(58) Field of Classification Search
CPC .............................. C22B 15/0078; C22B 34/34
USPC .......................................................... 75/743
See application file for complete search history.

(56) References Cited

U.S. PATENT DOCUMENTS 3,196,004 A * 7/1965 Kunda ............................ 75/416
3,911,076 A * 10/1975 Probert et al. ................... 423/53
(Continued)

FOREIGN PATENT DOCUMENTS

AU  2007231801 A1  5/2008
RO  100035 A2  9/1990

OTHER PUBLICATIONS

International Search Report and Written Opinion for PCT/AU2011/001113, mailed Mar. 23, 2012; ISA/AU.

*Primary Examiner* — George Wyszomierski
*Assistant Examiner* — Tima M McGurthy Banks
(74) *Attorney, Agent, or Firm* — Harness, Dickey & Pierce, P.L.C.

(57) ABSTRACT

A method for leaching copper and molybdenum from an ore, residue and/or concentrate containing such, in which more than 1% w/w of the total molybdenum is present as a sulfide and in which more than 1% w/w of the total copper is present as an oxide, the method comprising the steps of: exposing the ore, residue and/or concentrate to an aqueous solution of chlorine (I)-based oxidizing species of a pH of at least 3.0; oxidizing the molybdenum by the chlorine-based oxidizing species thereby providing a treated ore, residue and/or concentrate and a reduced aqueous solution of chlorine-based oxidizing species; leaching the treated ore, residue and/or concentrate by exposing the treated ore, residue and/or concentrate to an aqueous ammoniacal ammonium carbonate solution to form a pregnant leach solution containing both copper and molybdenum; and passing the pregnant leach solution containing both copper and molybdenum to a means for metal recovery.

19 Claims, 4 Drawing Sheets

(56) References Cited

U.S. PATENT DOCUMENTS

| | | | |
|---|---|---|---|
| 4,026,988 A | 5/1977 | Wells et al. | |
| 4,066,733 A * | 1/1978 | Dubeck et al. | 423/32 |
| 4,444,733 A | 4/1984 | Laferty et al. | |
| 2012/0148461 A1 * | 6/2012 | Rosenberg et al. | 423/53 |

* cited by examiner

METHOD FOR LEACHING OF COPPER AND MOLYBDENUM

CROSS-REFERENCE TO RELATED APPLICATIONS

This application is a 371 U.S. National Stage of International Application No. PCT/AU2011/001113, filed Aug. 29, 2011, and claims priority to Australian patent application No. 2010903845, filed on Aug. 27, 2010, the disclosures of which are herein incorporated by reference in their entirety.

FIELD OF THE INVENTION

The present invention relates to a method of leaching copper and molybdenum from ores and/or concentrates and/or residues containing both copper and molybdenum. More particularly, the method for leaching of the present invention applies to ores and/or concentrates and/or residues where molybdenum is present as a sulfide, and copper is present as an oxide.

BACKGROUND ART

Molybdenite ($MoS_2$) is a widespread mineral, but occurs exclusively in very few economic deposits. Most commonly, molybdenite is present as an accessory mineral in copper sulphide ores, such as those in porphyry deposits. These deposits become weathered over time, with the more reactive copper sulphide minerals converting to copper oxides, such as malachite and azurite, whilst the molybdenite remains relatively unweathered, remaining significantly as the suphide. There are many copper-molybdenum deposits that have such a weathered layer above the sulphide. The difficulty processing ores comprising a mixture or oxides and sulphides means that the weathered layer is often removed in order to access the underlying sulphides, and remains unprocessed.

Ores containing sulphide minerals can be processed by froth flotation, whereby the sulphides are separated from each other and concentrated. Such a process on a mixed oxide-sulphide ore will result in only the sulphide component being recovered.

In this context, the economic advantage of a process able to recover the metals from both copper oxides and molybdenum sulphides is immediately apparent. There is no present method by which copper oxide—molybdenum sulphide ores can be simultaneously (that is, without a separation step) treated using hydrometallurgical means. Such a process will of course allow economic recovery of these metals from lower grade ores or flotation tailings or residues.

Throughout this specification, unless the context requires otherwise, the term "copper oxide" refers to any non-sulphide copper-bearing mineral or mixture of minerals. Thus, the term copper oxide encompasses copper-bearing minerals containing anions such as carbonate, hydroxide, sulphate, nitrate, chloride and/ or phosphate. Accordingly, although the term copper oxide includes the oxide minerals tenorite and cuprite, it should not be understood to be restricted to such.

Throughout this specification, unless the context requires otherwise, the term "molybdenum sulphide" refers to molybdenum-bearing minerals which may also contain anions such as carbonate, hydroxide, sulphate, nitrate, chloride and/or phosphate, in addition to the molybdenum sulphide minerals.

Throughout this specification, unless the context requires otherwise, the word "comprise", or variations such as "comprises" or "comprising", will be understood to imply the inclusion of a stated integer or group of integers but not the exclusion of any other integer or group of integers The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

DISCLOSURE OF THE INVENTION

In accordance with the present invention, there is provided a method for leaching copper and molybdenum from an ore, residue and/or concentrate containing such, in which more than 1% of the total molybdenum is present as a sulfide and in which more than 1% of the total copper is present as an oxide, the method comprising the steps of:

Exposing the ore, residue and/or concentrate to an aqueous solution of chlorine (I)-based oxidising species of a pH of at least 3.0;

Allowing and/or facilitating the oxidation of the molybdenum by the chlorine-based oxidising species thereby providing a treated ore, residue and/or concentrate and a reduced aqueous solution of chlorine-based oxidising species; and Leaching the treated ore, residue and/or concentrate by exposing the treated ore, residue and/or concentrate to an aqueous ammoniacal ammonium carbonate solution to form a pregnant leach solution containing both copper and molybdenum;

Passing the pregnant leach solution containing both copper and molybdenum to a means for metal recovery.

In a preferred form of the invention, more than 5% of the total molybdenum is present as a sulfide. In a preferred form of the invention, more than 10% of the total molybdenum is present as a sulfide. In a preferred form of the invention, more than 20% of the total molybdenum is present as a sulfide.

In a preferred form of the invention, more than 5% of the total copper is present as an oxide. In a preferred form of the invention, more than 10% of the total copper is present as an oxide. In a preferred form of the invention, more than 20% of the total copper is present as an oxide.

The inventors have discovered that the hypochiorous acid and/or hypochlorite, present in aqueous solutions of chlorine (I)-based oxidising agents having a pH of at least 3 effectively oxidises molybdenum sulphide to form molybdenum oxide. Lower pH values have been shown to effect poor recovery of molybdenum. Without wishing to be bound by theory, it is believed that superior oxidation of molybdenum is effected by hypochlorous acid and hypochlorite and at pH levels below 3 there are insufficient concentrations of such species present Porphyries supply the majority of the world's supply of molybdenum in the form of a float concentrate that is sold to smelters for further processing. Until now there has been no way to extract both oxidised copper and molybdenum sulphide, the preset invention provides a way to extract both these metals concurrently from these economically important deposits.

In one form of the invention, the ore, residue and/or concentrate is a porphyry float concentrate.

In one form of the invention, the treated ore, residue and/or concentrate is provided in a mixture, the mixture comprising the treated ore, residue and/or concentrate and at least a residue from the reduced aqueous solution of chlorine-based oxidising species, and the step of:

leaching the treated ore, residue and/or concentrate by exposing the treated ore, residue and/or concentrate to an aqueous ammoniacal ammonium carbonate solution to form a pregnant leach solution containing both copper and molybdenum;

more specifically comprises exposing the mixture to the aqueous ammoniacal ammonium carbonate solution to form the pregnant leach solution containing both copper and molybdenum.

In a preferred form of the invention, the mixture comprises the treated ore, residue and/or concentrate and the majority of the reduced aqueous solution of chlorine-based oxidising species.

In a preferred form of the invention, the mixture comprises the treated ore, residue and/or concentrate and substantially all of the reduced aqueous solution of chlorine-based oxidising species.

Advantageously then, in preferred forms, the method of the present invention does not necessitate a thorough solid-liquid separation step prior to the exposure of the treated ore, residue and/or concentrate to the ammoniacal ammonium carbonate solution, thereby advantageously affecting the economics of the claimed invention. In highly preferred form, the method of the present invention does not necessitate any solid-liquid separation step prior to the exposure of the treated ore residue and/or concentrate to the ammoniacal ammonium carbonate solution, thereby considerably advantageously affecting the economics of the claimed invention It would be expected that exposure of at least a residue, if not substantially all, of the reduced aqueous solution of chlorine-based oxidising species of the mixture to the ammoniacal ammonium carbonate solution will result in considerable wastage of reagents. This is particularly the case if, as would be intuitive to a person skilled in the art, the aqueous solution of chlorine (I)-based oxidising agents is allowed to be reduced to the maximum extent, thereby producing an acidic aqueous solution of chlorine-based oxidising species, in which the predominant chlorine-based oxidising species has become chlorine, in part neutralising the ammoniacal ammonium carbonate solution. However, as is evident from the subsequent examples, the inventors have found that economically effective recoveries of molybdenum can be made with only small amounts of chlorine-based oxidising reagents, as the molybdenum concentration typically present in mixed molybdenum suphide—copper oxide ores is typically low. Furthermore, as explained below, at the preferred starting pH values of the aqueous solution of chlorine-based oxidising species, the final pH values are relatively high, further minimising consumption of reagents.

In a preferred form of the invention, the pH of the reduced aqueous solution of chlorine-based oxidising species is neutral or basic. In a preferred form of the invention, the pH of the reduced aqueous solution of chlorine-based oxidising species is between 7 and 10. In a highly preferred form of the invention, the pH of the reduced aqueous solution of chlorine-based oxidising species is between 8 and 9.5.

Generally, higher starting pHs for the aqueous solution of chlorine (I)-based oxidising agents are desirable. Preferably, the pH of the aqueous solution of chlorine (I)-based oxidising species is at least 3.5. Preferably, the pH of the aqueous solution of chlorine (I)-based oxidising species is at least 4.0. Preferably, the pH of the aqueous solution of chlorine (1)-based oxidising species is at least 4.5. Preferably, the pH of the aqueous solution of chlorine (I)-based oxidising species is at least 5.0. Preferably, the pH of the aqueous solution of chlorine (I)-based oxidising species is at least 5.5. Preferably, the pH of the aqueous solution of chlorine (I)-based oxidising species is at least 6.0. Preferably, the pH of the aqueous solution of chlorine (I)-based oxidising species is at least 6.5. Preferably, the pH of the aqueous solution of chlorine (I)-based oxidising species is at least 7.0. Preferably, the pH of the aqueous solution of chlorine (I)-based oxidising species is at least 7.5. Preferably, the pH of the aqueous solution of chlorine (I)-based oxidising species is at least 8.0. Preferably, the pH of the aqueous solution of chlorine (I)-based oxidising species is at least 8.5. Preferably, the pH of the aqueous solution of chlorine (I)-based oxidising species is at least 9.0. Preferably, the pH of the aqueous solution of chlorine (I)-based oxidising species is at least 9.5. Preferably, the pH of the aqueous solution of chlorine (I)-based oxidising species is at least 10.0. Preferably, the pH of the aqueous solution of chlorine (I)-based oxidising species is at least 10.5. Preferably, the pH of the aqueous solution of chlorine (I)-based oxidising species is at least 11.0. Preferably, the pH of the aqueous solution of chlorine (I)-based oxidising species is at least 11.5. Preferably, the pH of the aqueous solution of chlorine (I)-based oxidising species is at least 12.0. Preferably, the pH of the aqueous solution of chlorine (I)-based oxidising species is at least 12.5.

In a preferred form of the invention, the predominant chlorine (I)-based oxidising species present in the aqueous solution of chlorine-based oxidising species is hypochlorite ion.

The inventors have discovered that the hypochlorite ion is a particularly effective oxidiser of molybdenum sulphide at levels that enable smaller quantities to be used and/or the end pH of the process to be higher, both being more compatible with combining the reaction residue with ammoniacal ammonium carbonate solutions. Furthermore, the higher starting pH values limit the number of metals oxidised by the aqueous solution of chlorine (I)-based oxidising species. Hypochlorous acid is also an effective oxidiser of molybdenum sulphide, and the method of the present invention can be worked economically if the starting pH of the aqueous solution of chlorine (I)-based oxidising agent is one at which hypochlorous acid predominates, or lower, although the advantages afforded are not as great as if hypochlorite predominates. Accordingly, the scope of the present invention should not be understood to be restricted to pH values where hypochlorite predominates.

As would be understood by those skilled in the art, a sodium hypochlorite solution is produced as an alkaline solution which would require addition of acid in order to produce the aqueous solution of chlorine (I)-based oxidising species at lower starting pH than it is produced. Clearly, this adds to the overall cost of the process and adds additional anions, such as sulphate or chloride which have to be considered in the flowsheet. The lower pH will also attack a greater number of minerals present in the ore, thereby enhancing the solubility of other, non-target, metals present in the ore. The use of an acidic solution will also necessitate neutralisation of the acid in order to ensure the pH during the leaching step using the ammoniacal-ammonium carbonate is not adversely affected by reaction between the acid and carbonate anions. Neutralisation requires the addition of a base, lime, CaO, MgO, NaOH or hydrated versions thereof. This would result in precipitation of compounds such as gypsum which could affect percolation in a heap leach.

Consequently, it is most economically prudent to set the pH of the aqueous solution of chlorine-based oxidising species as close as possible to the natural pH of such solutions.

In a preferred form of the invention, the steps of:

Exposing the ore, residue and/or concentrate to an aqueous solution of chlorine (I)-based oxidising species of a pH of at least 3.0;

Allowing and/or facilitating the oxidation of the molybdenum by the chlorine-based oxidising species thereby providing a treated ore, residue and/or concentrate and a reduced aqueous solution of chlorine-based oxidising species; and Leaching the treated ore, residue and/or concentrate by exposing the treated ore, residue and/or concentrate to an aqueous ammoniacal ammonium carbonate solution to form a pregnant leach solution containing both copper and molybdenum;

Passing the pregnant leach solution containing both copper and molybdenum to a means for metal recovery;

are performed at ambient temperature.

In one form of the invention, the steps of

Exposing the ore, residue and/or concentrate to an aqueous solution of chlorine (I)-based oxidising species of a pH of at least 3.0;

Allowing and/or facilitating the oxidation of the molybdenum by the chlorine-based oxidising species thereby providing a treated ore, residue and/or concentrate and a reduced aqueous solution of chlorine-based oxidising species; and Leaching the treated ore, residue and/or concentrate by exposing the treated ore, residue and/or concentrate to an aqueous ammoniacal ammonium carbonate solution to form a pregnant leach solution containing both copper and molybdenum;

Passing the pregnant leach solution containing both copper and molybdenum to a means for metal recovery;

are performed at atmospheric pressure.

In one form of the invention, the steps of:

Exposing the ore, residue and/or concentrate to an aqueous solution of chlorine (I)-based oxidising species of a pH of at least 3.0;

Allowing and/or facilitating the oxidation of the molybdenum by the chlorine-based oxidising species thereby providing a treated ore, residue and/or concentrate and a reduced aqueous solution of chlorine-based oxidising species; and Leaching the treated ore, residue and/or concentrate by exposing the treated ore, residue and/or concentrate to an aqueous ammoniacal ammonium carbonate solution to form a pregnant leach solution containing both copper and molybdenum;

Passing the pregnant leach solution containing both copper and molybdenum to a means for metal recovery;

are performed at ambient temperature and atmospheric pressure.

A process that enables recoveries at ambient temperatures may be cost effectively used on ore as well as concentrate, as there is no requirement to heat the whole ore which typically contains <0.5% molybdenum and <5% Cu thereby saving significant amounts of energy. The ambient temperature and pressure process may make it economically possible to heap leach molybdenum and copper from ores which cannot otherwise be processed economically due to the high cost of crushing, grinding, sulphide flotation, sulphide roasting, calcine dissolution and then leaching the oxide minerals in the flotation tailings.

In one form of the invention, the molybdenum content of the ore, residue and/or concentrate is less than 5% w/w. In one form of the invention, the molybdenum content of the ore, residue and/or concentrate is less than 2% w/w. In one form of the invention, the molybdenum content of the ore, residue and/or concentrate is less than 1% w/w. In one form of the invention, the molybdenum content of the ore, residue and/or concentrate is less than 0.5% w/w. In one form of the invention, the molybdenum content of the ore, residue and/or concentrate is less than 0.1% w/w. In one form of the invention, the molybdenum content of the ore, residue and/or concentrate is less than 0.05% w/w. In one form of the invention, the molybdenum content of the ore, residue and/or concentrate is less than 0.02% w/w. In one form of the invention, the molybdenum content of the ore, residue and/or concentrate is less than 0.01% w/w.

In one form of the invention, the copper content of the ore, residue and/or concentrate is less than 10% w/w. In one form of the invention, the copper content of the ore, residue and/or concentrate is less than 5% w/w. In one form of the invention, the copper content of the ore, residue and/or concentrate is less than 2% w/w. In one form of the invention, the copper content of the ore, residue and/or concentrate is less than 1% w/w. In one form of the invention, the copper content of the ore, residue and/or concentrate is less than 0.5% w/w. In one form of the invention, the copper content of the ore, residue and/or concentrate is less than 1% w/w.

In a preferred form of the invention, the ore, residue and/ore concentrate exposed to the aqueous solution of chlorine (I)-based oxidising species of a pH of at least 3.0 is previously unleached.

In a preferred form of the invention, the ore and/ore concentrate exposed to the aqueous solution of chlorine (I)-based oxidising species of a pH of at least 3.0 is previously unroasted.

Without wishing to be bound by theory, the inventors believe that exposure of the sulfide ore and/or concentrate to hypochlorous acid or hypochlorite ion present in aqueous solutions of chlorine (I)-based oxidising species of a pH of at least 3.0 diminishes the formation of a passivating layer that may be responsible for the lower recoveries reported with chlorine leaching at low pH.

As would be understood by a person skilled in the art, hypochlorite ions are also known as chlorate(I) ions and has a molecular formula of $ClO^-$.

As would be understood by a person skilled in the art, hypochlorous acid is also known as chloric (I) acid, hydrogen hypochlorous acid and hydrogen chlorate (I), and has a molecular formula of $HClO$ (or $HOCl$).

The period for which the ore, residue and/or concentrate is exposed to the aqueous solution of chlorine-based oxidising species in which the pH is at least 3.0 may be controlled by controlling the pH of the aqueous solution. This may be done by the addition of base, and/or controlling the pH to thereby control sulfate production.

The preferred period for which the ore, residue and/or concentrate is exposed to the aqueous solution of chlorine-based oxidising species in which the pH is at least 3.0 will vary with mineralogy of the ore or concentrate. However, as will be evident from the following examples, even brief exposures may provide advantageous results.

The method of the present invention may form part of a process by which metals other than copper and molybdenum are additionally recovered. For example, the method of the present invention may be utilised to reduce the molybdenum concentration in a copper concentrate prior to the concentrate being further processed to recover the copper.

The means for metal recovery of the present invention may comprise one or more solvent extraction stages, optionally followed by electrowinning or precipitation.

As will be recognised by those skilled in the art the concentration of chlorine-based oxidising species will vary according to the concentration of the molybdenite in the ore or concentrate and the presence of other oxidising agent consuming minerals present in the ore or concentrate.

BRIEF DESCRIPTION OF THE DRAWINGS

The present invention will now be described, by way of example only, with reference to one embodiment thereof and the accompanying drawings, in which.

BEST MODE(S) FOR CARRYING OUT THE INVENTION

Figure 1:
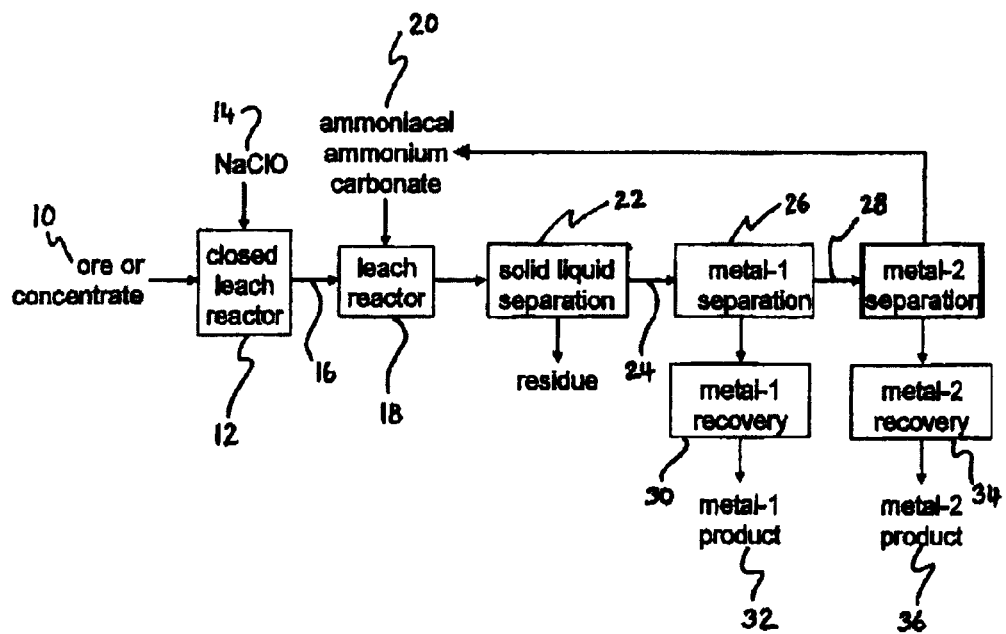
FIG. 1 is a schematic flow sheet of a method for leaching one or more of the target metals from a sulfide ore and/or concentrate in accordance with the present invention.

A sulfide ore or concentrate 10 containing molybdenum and copper, such as molybdenite, is introduced into a closed leach vessel 12. An aqueous solution containing hypochlorite ions 14 is introduced into the leach vessel 12, such that the ore is exposed, for a predetermined period, to an aqueous solution in which the predominant chlorine-based oxidising species is hypochlorite ions. As a result of the consequent reduction in pH, the ore is then exposed, within the same closed leach vessel 12, to an aqueous solution in which the predominant chlorine-based oxidising species is hypochlorous acid and, if the pH decreases sufficiently, to an aqueous solution in which the predominant chlorine-based oxidising species is chlorine. After a predetermined period, the resulting slurry 16 is passed to an open reaction vessel 18, into which is introduced an ammoniacal-ammonium carbonate solution 20, wherein the ore is subject to leaching.

After a predetermined leach period, the slurry is transferred to a solid-liquid separation phase 22, and the pregnant leach solution containing target metal ions (copper and molybdenum) 24 transferred to a metal separation stage 26 such as solvent extraction, ion exchange, selective precipitation, and/or cementation, whereby non-target metals are separated from the pregnant leach solution containing target metal ions 24. The resulting target metal solution 28 is then transferred to a target metal separation stage such as solvent extraction, ion exchange, selective precipitation, and/or cementation. The metal-1 rich solution is then transferred to a metal recovery stage 30, such as cementation, gaseous reduction, compound precipitation, crystallisation and/or electrowinning, yielding the first target metal 32. The metal-1-depleted, metal-2 rich solution is then transferred to a metal recovery stage 34, such as cementation, gaseous reduction, compound precipitation, crystallisation and/or electrowinning, yielding the first target metal 36.

EXAMPLES

The utility of the present invention will now be demonstrated by reference to an example. The example should not be understood as in any way limiting the generality of the preceding description of the invention.

Example 1

Two different copper-molybdenum ores were tested, the headgrades of these two ores are shown in the table below.

| sample | Cu % | Mo % |
| --- | --- | --- |
| A | 1.375 | 0.553 |
| B | 3.180 | 0.597 |

The molybdenum was present as molybdenite, $MoS_2$, the copper mineral present was not positively identified but was believed to be primarily non-sulphide.

Figure 2:
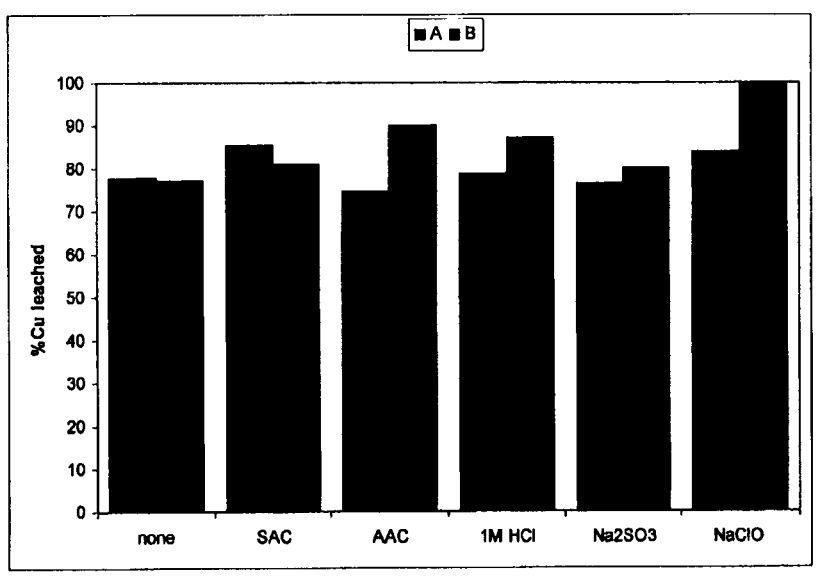
FIG. 2 is a chart showing the copper and molybdenum recovery from the sample of Example 1.
Figure 3:
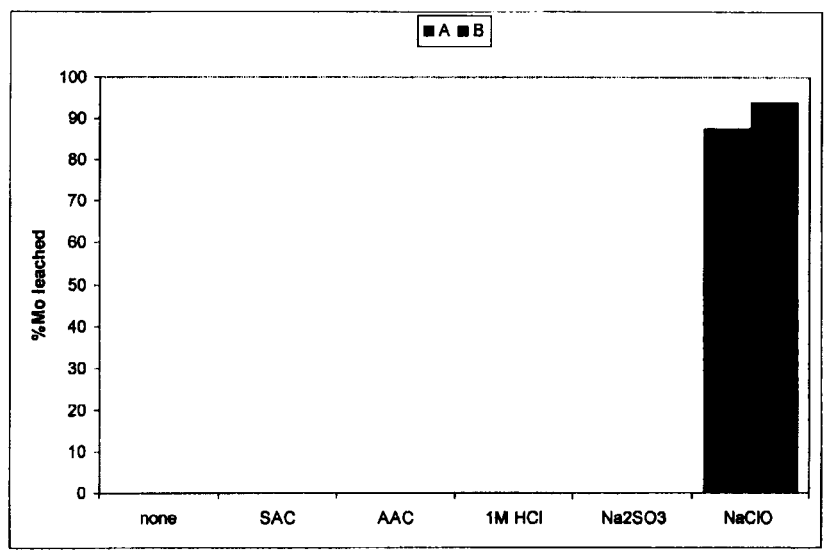
FIG. 3 is a chart showing the copper and molybdenum recovery from the sample of Example 1.

A weighed 5.0 g mass of ore was mixed with 2.5 mL of a solution of a range different pretreatment agents. The paste thus formed was allowed to rest for 24 h at which time 250 mL of a solution comprising 20 g/L ammonia+20 g/L ammonium carbonate was added. The resultant slurry was agitated for a further 24 h after which solution samples were taken and analysed for Cu and Mo. The charts shown in FIGS. 2 and 3 show the copper and molybdenum recovery from these samples. SAC—70 g/L ammonia+5 g/L ammonium carbonate; AAC –20 g/L ammonia +20 g/L ammonium carbonate; $Na2SO_3$—saturated sodium sulphite solution; NaClO—125 g/L NaClO solution.

As is clear, the copper recovery is much less affected by the pretreatment than the molybdenum recovery. The NaClO seemed to be effective at increasing the copper recovery compared with the other pretreatments. Without wishing to be bound by theory, it is believed that this was due to the presence of copper sulphide minerals which are not readily oxidised by the other pretreatments.

Figure 4:
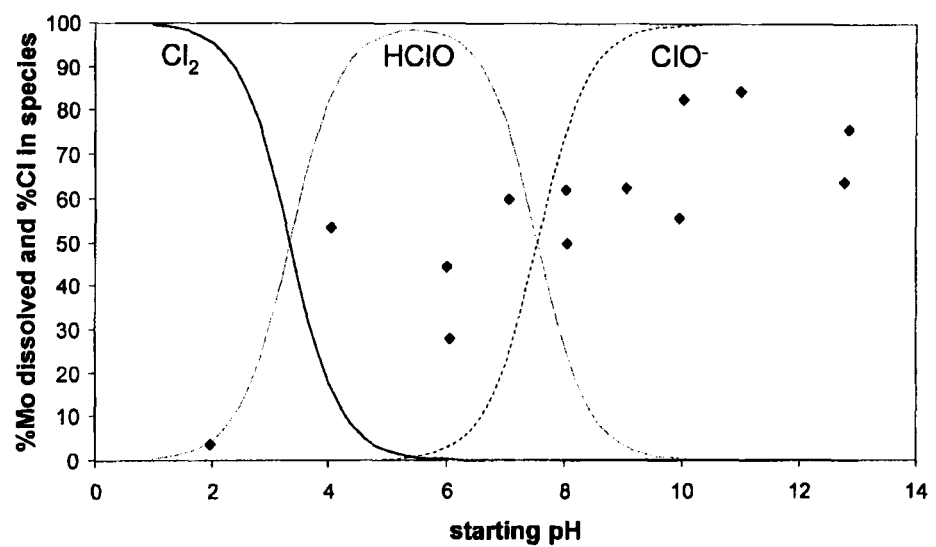
FIG. 4 is a chart showing the effect that starting pH has on copper and molybdenum recovery.

FIG. 4 illustrates the significance of the pH of the aqueous solution of chlorine-based oxidizing agents being at least 3. Although the experimental data on which the graph is based was generated using a pure molybdenite float concentrate (not a mixed copper oxide-molybdenum sulfide), the results are directly applicable.

The claim defining the invention is as follows:

1. A method for leaching copper and molybdenum from a material, selected from a group consisting of one or more of an ore, residue and concentrate containing such, in which more than 1% w/w of the total molybdenum is present as a sulfide and in which more than 1% w/w of the total copper is present as an oxide, the method comprising the steps of:
   Exposing the material to an aqueous solution of chlorine (I)-based oxidizing species of a pH of at least 3.0;
   Oxidizing the molybdenum by the chlorine-based oxidizing species thereby providing a treated material and a reduced aqueous solution of chlorine-based oxidizing species;
   Leaching the treated material by exposing the treated material to an aqueous ammoniacal ammonium carbonate solution to form a pregnant leach solution containing both copper and molybdenum; and
   Passing the pregnant leach solution containing both copper and molybdenum to a means for metal recovery.

2. The method according to claim 1 wherein more than 20% w/w of the total molybdenum is present as a sulfide.

3. The method according to claim 1 wherein more than 20% w/w of the total copper is present as an oxide.

4. The method according to claim 1 wherein the ore, residue and/or concentrate is a porphyry float concentrate.

5. The method according to claim 1 wherein the mixture comprising the treated ore, residue and/or concentrate and at least a residue from the reduced aqueous solution of chlorine-based oxidizing species, and the step of:
   leaching the treated ore, residue and/or concentrate by exposing the treated ore, residue and/or concentrate to an aqueous ammoniacal ammonium carbonate solution to form a pregnant leach solution containing both copper and molybdenum;

more specifically comprises exposing the mixture to the aqueous ammoniacal ammonium carbonate solution to form the pregnant leach solution containing both copper and molybdenum.

6. The method according to claim 5 wherein the mixture comprises the treated ore, residue and/or concentrate and the majority of the reduced aqueous solution of chlorine-based oxidizing species.

7. The method according to claim 6 wherein the mixture comprises the treated ore, residue and/or concentrate and substantially all of the reduced aqueous solution of chlorine-based oxidizing species.

8. The method according to claim 1 wherein the method does not employ any solid-liquid separation step prior to the exposure of the treated ore residue and/or concentrate to the ammoniacal ammonium carbonate solution.

9. The method according to claim 1 wherein the pH of the reduced aqueous solution of chlorine-based oxidizing species is neutral or basic.

10. The method according to claim 9 wherein the pH of the reduced aqueous solution of chlorine-based oxidizing species is between 7 and 10.

11. The method according to claim 10 wherein the pH of the reduced aqueous solution of chlorine-based oxidizing species is between 8 and 9.5.

12. The method according to claim 1 wherein the pH of the aqueous solution of chlorine (I)-based oxidizing species is at least 3.5.

13. The method according to claim 1 wherein the predominant chlorine (I)-based oxidizing species present in the aqueous solution of chlorine-based oxidizing species is hypochlorite ion.

14. The method according to claim 1 wherein the steps of:

Exposing the material to an aqueous solution of chlorine (I)-based oxidizing species of a pH of at least 3.0;

oxidizing the molybdenum by the chlorine-based oxidizing species thereby providing a treated material and a reduced aqueous solution of chlorine-based oxidizing species;

Leaching the treated material by exposing the treated material to an aqueous ammoniacal ammonium carbonate solution to form a pregnant leach solution containing both copper and molybdenum; and Passing the pregnant leach solution containing both copper and molybdenum to a means for metal recovery;

are performed at ambient temperature.

15. The method according to claim 1 wherein the steps of:

Exposing the material to an aqueous solution of chlorine (I)-based oxidizing species of a pH of at least 3.0;

oxidizing of the molybdenum by the chlorine-based oxidizing species thereby providing a treated material and a reduced aqueous solution of chlorine-based oxidizing species;

Leaching the treated material by exposing the treated material to an aqueous ammoniacal ammonium carbonate solution to form a pregnant leach solution containing both copper and molybdenum; and Passing the pregnant leach solution containing both copper and molybdenum to a means for metal recovery;

are performed at atmospheric pressure.

16. The method according to claim 1 wherein the molybdenum content of the ore, residue and/or concentrate is less than 5% w/w.

17. The method according to claim 1 wherein the copper content of the ore, residue and/or concentrate is less than 10% w/w.

18. The method according to claim 1 wherein the ore, residue and/ore concentrate exposed to the aqueous solution of chlorine (I)-based oxidizing species of a pH of at least 3.0 is previously unleached.

19. The method according to claim 1 wherein the ore and/ore concentrate exposed to the aqueous solution of chlorine (I)- based oxidizing species of a pH of at least 3.0 is previously unroasted.

* * * * *